US007609893B2

(12) United States Patent
Luo et al.

(10) Patent No.: US 7,609,893 B2
(45) Date of Patent: Oct. 27, 2009

(54) METHOD AND APPARATUS FOR PRODUCING CLASSIFIER TRAINING IMAGES VIA CONSTRUCTION AND MANIPULATION OF A THREE-DIMENSIONAL IMAGE MODEL

(75) Inventors: Yun Luo, Livonia, MI (US); Jon K. Wallace, Redford, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 571 days.

(21) Appl. No.: 10/792,445

(22) Filed: Mar. 3, 2004

(65) Prior Publication Data

US 2005/0196035 A1 Sep. 8, 2005

(51) Int. Cl.
*G06K 9/62* (2006.01)
(52) U.S. Cl. ............... 382/224; 382/154; 382/225; 382/226; 382/227; 345/419; 345/420; 345/421; 345/422; 345/423; 345/424; 345/425; 345/426; 345/427; 356/12; 707/1
(58) Field of Classification Search ................ 382/154, 382/224–227; 345/419–427; 356/12; 707/1
See application file for complete search history.

(56) References Cited

U.S. PATENT DOCUMENTS

| | | | |
|---|---|---|---|
| 5,781,198 A * | 7/1998 | Korn .................... | 345/634 |
| 5,903,884 A | 5/1999 | Lyon et al. | |
| 6,134,344 A * | 10/2000 | Burges ................... | 382/155 |
| 6,137,909 A * | 10/2000 | Greineder et al. ........... | 382/190 |
| 6,690,820 B2 * | 2/2004 | Lees et al. .................. | 382/154 |
| 6,781,619 B1 * | 8/2004 | Shirakura et al. ............ | 348/46 |
| 6,798,897 B1 * | 9/2004 | Rosenberg ................. | 382/107 |
| 6,961,443 B2 * | 11/2005 | Mahbub .................... | 382/100 |
| 7,130,776 B2 * | 10/2006 | Ii et al. ......................... | 703/2 |
| 2002/0050924 A1 | 5/2002 | Mahbub | |
| 2002/0159641 A1* | 10/2002 | Whitney et al. ............. | 382/219 |
| 2003/0235332 A1 | 12/2003 | Moustafa | |

FOREIGN PATENT DOCUMENTS

| | | |
|---|---|---|
| WO | WO 96/04614 A1 | 2/1996 |
| WO | WO-99/49414 A1 | 9/1999 |
| WO | WO-03/091941 A1 | 11/2003 |

* cited by examiner

*Primary Examiner*—Brian Q Le
*Assistant Examiner*—Edward Park
(74) *Attorney, Agent, or Firm*—Tarolli, Sundheim, Covell & Tummino LLP

(57) ABSTRACT

A system (400) for generating training images for a pattern recognition classifier (54) from three-dimensional image data representing an output class comprises a model constructor (404) that constructs an image model in a standard coordinate domain from the three-dimensional image data. A model transformer (406) manipulates the image model in the standard coordinate domain to produce at least one manipulated image model. An image restorer (408) maps the at least one manipulated image model from the standard coordinate domain to a coordinate domain associated with an image source utilized during the run-time operation of the pattern recognition classifier.

6 Claims, 3 Drawing Sheets

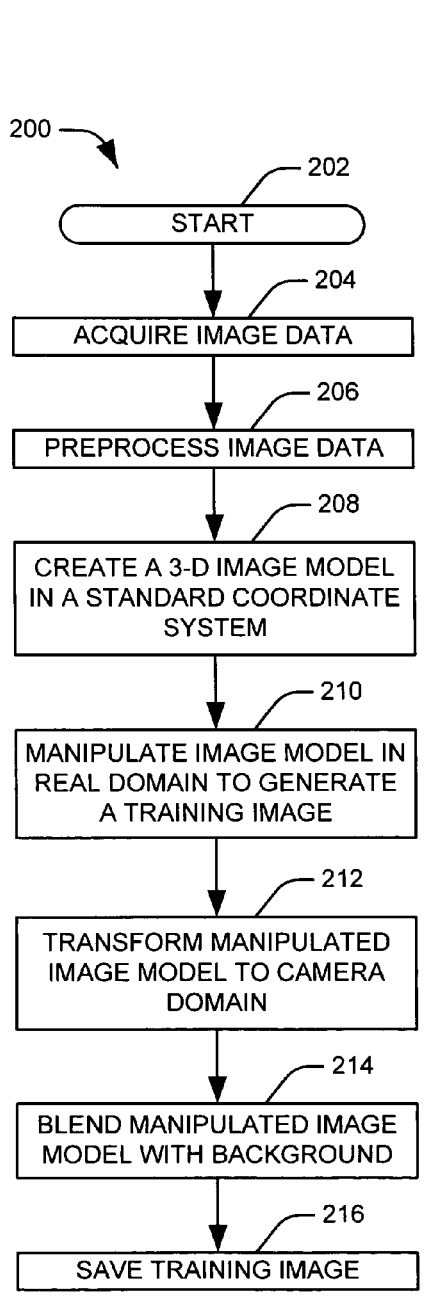
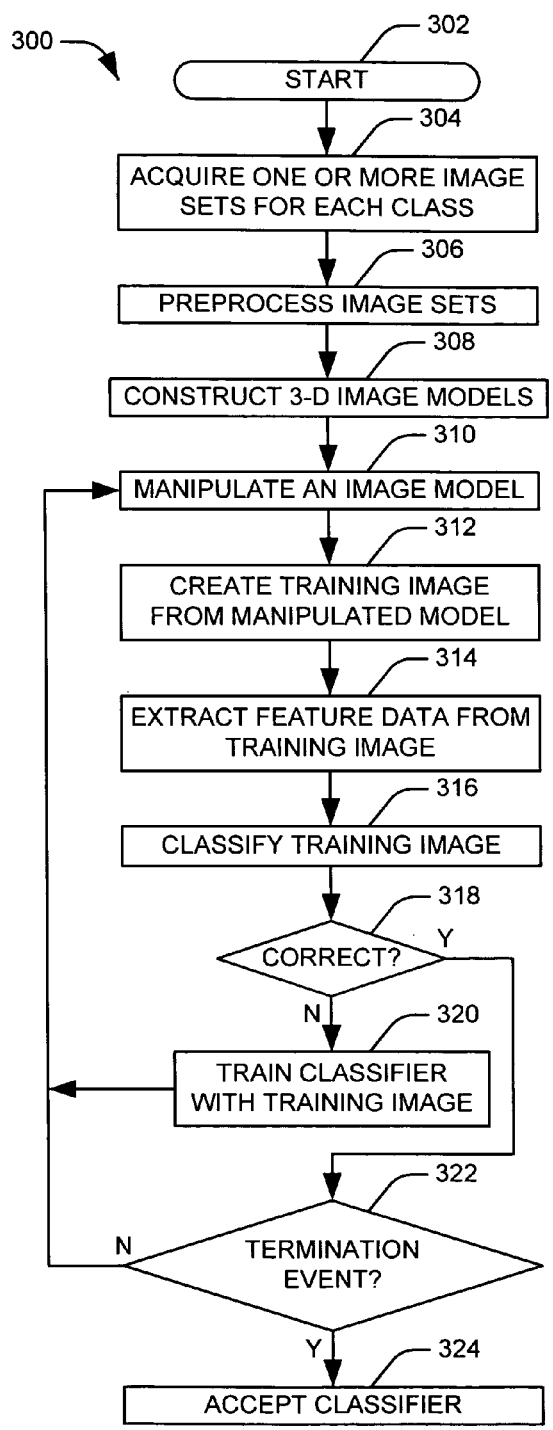
FIG. 3
FIG. 4

METHOD AND APPARATUS FOR PRODUCING CLASSIFIER TRAINING IMAGES VIA CONSTRUCTION AND MANIPULATION OF A THREE-DIMENSIONAL IMAGE MODEL

TECHNICAL FIELD

The present invention is directed generally to pattern recognition classifiers and is particularly directed to a method and apparatus for producing training images for a pattern recognition classifier. The present invention is particularly useful in occupant restraint systems for object and/or occupant classification.

BACKGROUND OF THE INVENTION

Actuatable occupant restraining systems having an inflatable air bag in vehicles are known in the art. Such systems that are controlled in response to whether the seat is occupied, an object on the seat is animate or inanimate, a rearward facing child seat present on the seat, and/or in response to the occupant's position, weight, size, etc., are referred to as smart restraining systems. One example of a smart actuatable restraining system is disclosed in U.S. Pat. No. 5,330,226.

Pattern recognition systems can be loosely defined as systems capable of distinguishing between classes of real world stimuli according to a plurality of distinguishing characteristics, or features, associated with the classes. A number of pattern recognition systems are known in the art, including various neural network classifiers, self-organizing maps, and Bayesian classification models. A common type of pattern recognition system is the support vector machine, described in modern form by Vladimir Vapnik [C. Cortes and V. Vapnik, "Support Vector Networks," *Machine Learning*, Vol. 20, pp. 273-97, 1995].

Support vector machines are intelligent systems that generate appropriate separating functions for a plurality of output classes from a set of training data. The separating functions divide an N-dimensional feature space into portions associated with the respective output classes, where each dimension is defined by a feature used for classification. Once the separators have been established, future input to the system can be classified according to its location in feature space (e.g., its value for N features) relative to the separators. In its simplest form, a support vector machine distinguishes between two output classes, a "positive" class and a "negative" class, with the feature space segmented by the separators into regions representing the two alternatives.

SUMMARY OF THE INVENTION

In accordance with one exemplary embodiment of the present invention, a system is provided for generating training images for a pattern recognition classifier from three-dimensional image data representing an output class. A model constructor constructs an image model in a standard coordinate domain from the three-dimensional image data. A model transformer manipulates the image model in the standard coordinate domain to produce at least one manipulated image model. An image restorer maps the at least one manipulated image model from the standard coordinate domain to a coordinate domain associated with an image source utilized during the run-time operation of the pattern recognition classifier.

In accordance with another exemplary embodiment of the present invention, a system is provided for generating training images for a pattern recognition classifier associated with a vehicle occupant safety system. A plurality of vision systems each images a subject to provide three-dimensional image data representing an output class. A model constructor maps at least a portion of the three-dimensional image data from each vision system from a coordinate domain related to the vision system to a vehicle coordinate domain to form an image model. A model transformer manipulates the image model in the standard coordinate domain to produce at least one manipulated image model. An image restorer maps the at least one manipulated image model from the vehicle coordinate domain into a desired coordinate domain.

In accordance with yet another exemplary embodiment of the present invention, an occupant classifier training method is provided for use in vehicle restraining systems. An image model is produced in a vehicle coordinate system. The image model is transformed to simulate at least one desired property associated with a vehicle occupant. The transformed image model is mapped to a camera coordinate domain associated with the run-time operation of the classifier to create a training image. A pattern recognition classifier is trained using the training image.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 3 is a flow chart showing a training image generation algorithm in accordance with an exemplary embodiment of the present invention;

FIG. 4 is a flow chart showing a training process in accordance with an exemplary embodiment of the present invention.

DESCRIPTION OF PREFERRED EMBODIMENT

Figure 1:
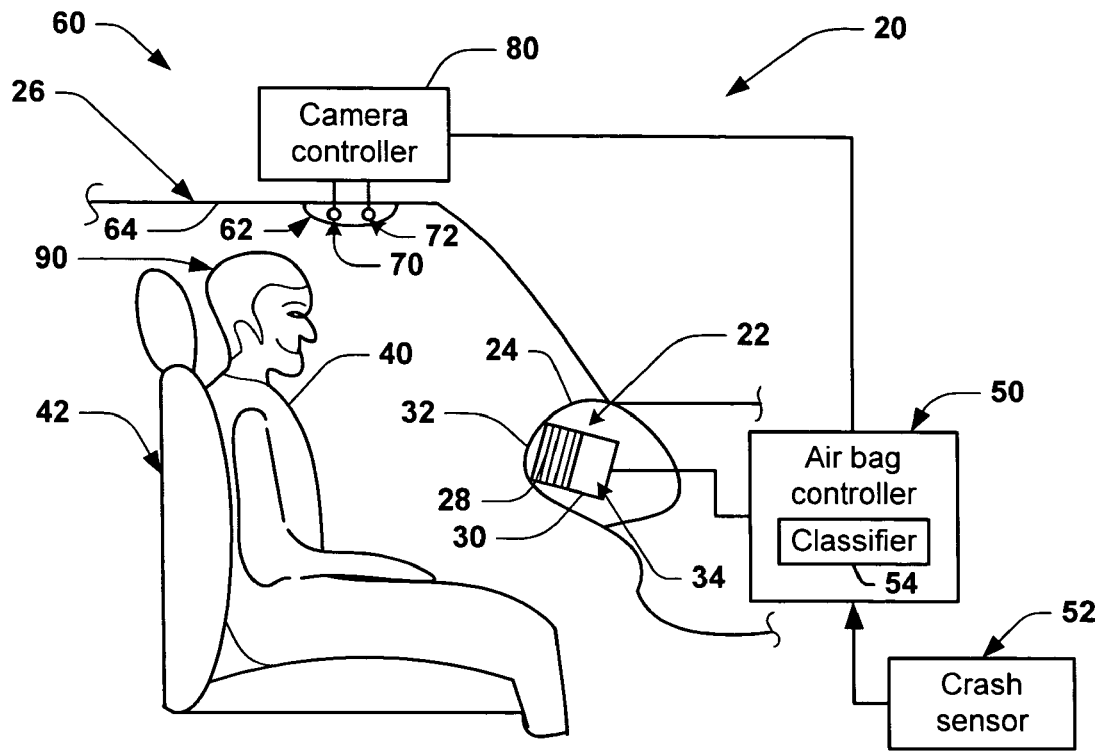
FIG. 1 is a schematic illustration of an actuatable restraining system in accordance with an exemplary embodiment of the present invention.

Referring to FIG. 1, an exemplary embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, e.g., timing, gas flow, bag profile as a function of time, gas pressure, etc. Once inflated, the air bag 28 may help protect an occupant 40, such as a vehicle passenger, sitting on a vehicle seat 42. Although the embodiment of FIG. 1 is described with regard to a vehicle passenger seat, it is applicable to a vehicle driver seat and back seats and their associated actuatable restraining systems. The present invention is also applicable to the control of side actuatable restraining devices.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers or other deployment event sensors. The controller monitors the output signal(s) from the crash sensor 52 and, in accordance with an air bag control algorithm using a crash analysis algorithm, determines if a deployment crash event is occurring, i.e., one for which it may be desirable to deploy the air bag 28. There are several known deployment crash analysis algorithms responsive to crash acceleration signal(s) that may be used as part of the present invention. Once the controller 50 determines that a deployment vehicle crash event is occurring using a selected crash analysis algorithm, and if certain other occupant characteristic conditions are satisfied, the controller 50 controls inflation of the air bag 28 using the gas control portion 34, e.g., timing, gas flow rate, gas pressure, bag profile as a function of time, etc.

The air bag restraining system 20, in accordance with the present invention, further includes a stereo-vision assembly 60. The stereo-vision assembly 60 includes stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

The camera controller 80 can take any of several forms such as a microcomputer, discrete circuitry, ASIC, etc. The camera controller 80 is connected to the air bag controller 50 and provides a signal to the air bag controller 50 to provide data relating to various characteristics of the occupant. The air bag control algorithm associated with the controller 50 can be made sensitive to the provided image data. For example, if the provided data indicates that the occupant 40 is an object, such as a shopping bag, and not a human being, actuating the air bag serves no purpose, and the controller 50 would be programmed not to actuate the air bag in such situations. Accordingly, the air bag controller 50 can include a pattern recognition classifier 54. During run time operation, the classifier is operative to distinguish between a plurality of occupant classes based on the data provided by the camera controller and adjust control of the air bag assembly in response to the classifier output.

Figure 2:
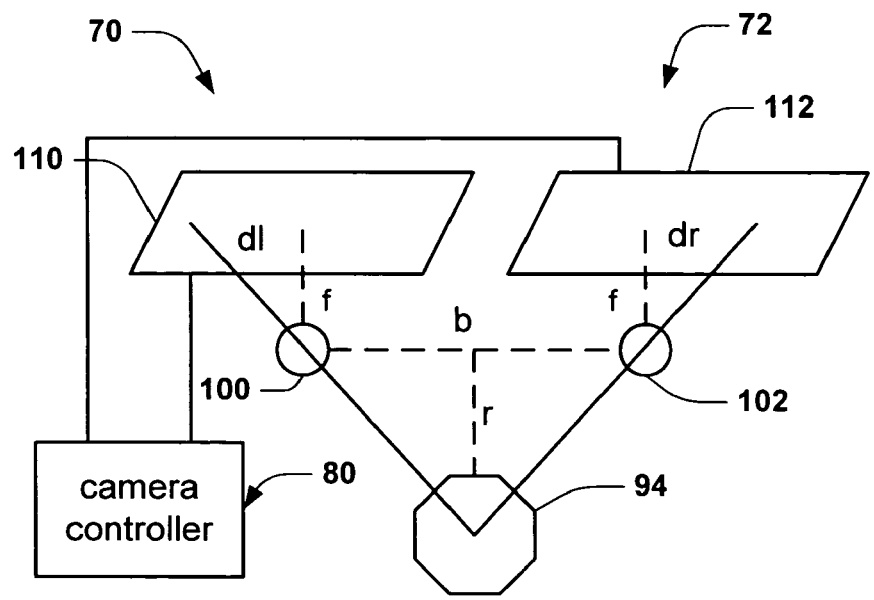
FIG. 2 is a schematic illustration of a stereo camera arrangement for use with the present invention for determining location of an occupant's head.

Referring to FIG. 2, the cameras 70, 72 may be of any several known types. In accordance with one exemplary embodiment, the cameras 70, 72 are charge-coupled devices ("CCD") or complementary metal-oxide semiconductor ("CMOS") devices. One way of determining the distance or range between the cameras and an object 94 is by using triangulation. Since the cameras are at different viewpoints, each camera sees the object at different position. The image difference is referred to as "disparity." To get a proper disparity determination, it is desirable for the cameras to be positioned and set up so that the object to be monitored is within the horopter of the cameras.

The object 94 is viewed by the two cameras 70, 72. Since the cameras 70, 72 view the object 94 from different viewpoints, two different images are formed on the associated pixel arrays 110, 112, of cameras 70, 72 respectively. The distance between the viewpoints or camera lenses 100, 102 is designated "b." The focal length of the lenses 100 and 102 of the cameras 70 and 72 respectively, is designated as "f." The horizontal distance from the image center on the CCD or CMOS pixel array 110 and the image of the object on the pixel array 110 of camera 70 is designated "dl" (for the left image distance). The horizontal distance from the image center on the CCD or CMOS pixel array 112 and the image of the object 94 on the pixel array 112 for the camera 72 is designated "dr" (for the right image distance). Preferably, the cameras 70, 72 are mounted so that they are in the same image plane. The difference between dl and dr is referred to as the "image disparity," and is directly related to the range distance "r" to the object 94 where r is measured normal to the image plane. It will be appreciated that $$r = bf/d, \text{ where } d = dl - dr \qquad \text{Eq. 1}$$

From equation 1, the range as a function of disparity for the stereo image of an object 94 can be determined. It should be appreciated that the range is an inverse function of disparity. Range resolution is a function of the range itself. At closer ranges, the resolution is much better than for farther ranges. Range resolution $\Delta r$ can be expressed as:

$$\Delta r = (r^2/bf)\Delta d \qquad \text{Eq. 2}$$

The range resolution, $\Delta r$, is the smallest change in range that is discernible by the stereo geometry, given a change in disparity of $\Delta d$.

Referring to FIG. 3, a method 200 is shown for generating a training image for a classification system, such as the pattern recognition classifier 54 illustrated in FIG. 1, in accordance with one exemplary embodiment of the present invention. Although serial and parallel processing is shown, the flow chart is given for explanation purposes only and the order of the steps and the type of processing can vary from that shown. The method is initialized at step 202, in which internal memories are cleared, initial flag conditions are set, etc.

At 204, base image data, representing an output class of the classifier 54, is acquired from an image source. The base image data can comprise a three-dimensional image of a subject, acquired via holography or a similar technique, or a plurality of two-dimensional images of a subject, taken from a variety of different orientations, that can be combined to produce a three-dimensional surface model of the subject. For example, the base image data can be acquired via one or more stereo camera arrangements as described in FIG. 2.

The acquired base image data is preprocessed in step 206 to produce a viable three-dimensional image for analysis. For example, the base image data can be processed to remove background information surrounding an imaged subject and remove noise from the image. The image or images comprising the base image data can also be processed to better emphasize desired image features and maximize the contrast between structures in the image. For example, a contrast limited adaptive histogram equalization (CLAHE) process can be applied to the one or more images comprising the base image data to adjust for lighting conditions. The CLAHE process lessens the influence of saturation resulting from direct sunlight and low contrast dark regions caused by insufficient lighting. The CLAHE process subdivides a given image into contextual regions and applies a histogram-based equalization to each region. The equalization process distributes the grayscale values in each region across a wider range to accentuate the contrast between structures within the region. This can make otherwise hidden features of an image more visible.

At step 208, a three-dimensional surface model is created in a standard domain to provide an image model for manipulation. Where three-dimensional image data has already been acquired in the standard domain (e.g., via holographic or other interference imaging), the image model simply comprises the acquired data. In an exemplary embodiment, however, the acquired base image data can comprise multiple range images representing three-dimensional data from various viewpoints and depicting different portions of the surface of the subject. The multiple range images can be mapped from their original coordinate domains to a standard coordinate domain and combined to produce a three-dimensional image model of the surface of the subject.

The standard domain coordinate axes are defined to simplify manipulation of the image data. Accordingly, they are determined, by an operator, for example, according to likely patterns of variation associated with the imaged subject. For example, if the imaged subject is a vehicle passenger sitting in a car seat, likely variations of the subject include different horizontal and vertical seat positions, different positions of the seat back, and various movements that a vehicle passenger might be expected to make, such as bending forward or turning to one side. In the vehicle implementation, the real domain represents a coordinate system associated with a vehicle interior. The base image data is mapped to the defined vehicle coordinates to produce an image model for manipulation.

At step 210, the image model is manipulated to create a new image of the occupant. This manipulation can include translating the position of the image model along one or more of the three standard domain axes, changing one or more of the associated pitch, roll, and yaw of the image data relative to the standard coordinate system, scaling the image to a different size, or any of a variety of other projective, affine, or similitude transformations. A pixel-by-pixel transformation of the image can be accomplished by multiplying each of a series of vectors representing the pixels comprising the image by a transformation matrix associated with the desired transformation. The resulting pixel values collectively define the manipulated image.

At step 212, the manipulated image model is transformed into a camera domain. The manipulated image model is mapped into a desired coordinate domain. For example, a coordinate domain associated with a camera used during the operation of the classifier can be selected. The camera domain can include three coordinate axes, an x-axis and a y-axis aligned normal to one another within the plane of the camera, and a z-axis, normal to the xy-plane, that represents the distance of a given object from the defined xy-plane. These axes are aligned as to simplify analysis of the image and range data produced at the camera.

At 214, the mapped image data from the manipulated image model is blended with an image background, and, optionally, image data from one or more manipulated image models of other subjects, to form an image suitable for training purposes. For example, a plurality of different backgrounds can be utilized, each based on an image taken of an environment in which the classifier will be operated. A background image can be adjustable according to the characteristics, such as orientation and size, of the image model. At step 216, the image is saved as part of a training set.

It will be appreciated that steps 210, 212, 214, and 216 of the illustrated method 200 can be repeated with different transformation matrices and different background data to produce a plurality of training images from a single image model. Accordingly, hundreds or even thousands of training images for a given class can be generated by applying a different transformation matrix to the image model for each image. A series of transformation matrices can be selected by an operator for a given image model or a number of transformation matrices can be generated randomly. For example, each of a plurality of variable matrix coefficients can have an associated probability distribution based upon an observation of standard world samples. Values for a given transformation matrix can be generated randomly according to the assigned probability distributions.

Referring to FIG. 4, a training process 300 for a pattern recognition classifier, incorporating an exemplary implementation of the present invention, is shown. In the illustrated embodiment, multiple stereo cameras are utilized to produce base image data associated with one or more subjects. It will be appreciated, however, that other image sources can be used in conjunction with the present invention. Although serial and parallel processing is shown, the flow chart is given for explanation purposes only and the order of the steps and the type of processing can vary from that shown.

The training process is initialized at step 302, in which internal memories are cleared, initial flag conditions are set, etc. At step 304, base image data for one or more subjects is acquired. It will be appreciated that the base image data for each subject can comprise multiple simultaneous range images of the associated subject from different perspectives to be used in the generation of a comprehensive surface model of the subject. The imaged subjects can represent one or more desired output classes, with each class associated with one or more of the subjects.

Background information and noise are removed from the acquired base image data in step 306. The base image data can also be processed to better emphasize desired image features and maximize the contrast between structures in the image. For example, a contrast limited adaptive histogram equalization algorithm, as described previously, can be applied to increase contrast between image features.

At step 308, three-dimensional image models are created from the base image data. For example, three-dimensional image data from each of a plurality of stereo cameras can be generated for each subject as a plurality stereo disparity map. The Otsu algorithm [Nobuyuki Otsu, "A Threshold Selection Method from Gray-Level Histograms," IEEE Transactions on Systems, Man, and Cybernetics, Vol. 9, No. 1, pp. 62-66, 1979] can be used to obtain a binary image of an object with the assumption that a given subject of interest is close to a camera system. The images from each camera are processed in pairs and the disparity map is calculated to derive three-dimensional information about the image. Range data can be determined from the stereo disparity map as described above with reference to FIG. 2.

The range data from the plurality of stereo camera arrangements is then combined into a three-dimensional surface image. Each range image associated with the subject is transformed into a standard coordinate system. This can be accomplished as a pixel-by-pixel mapping of the range data from an original coordinate system associated with a given camera to the standard coordinate system. Selected range images are then fused to obtain a single three-dimensional composite surface representing the imaged subject. Finally, the resulting composite surface is evaluated to determine additional image views that would be useful in constructing the surface, and additional range images can be fused into the composite surface to form an image model. The process then advances to step 310.

At step 310, one of the image models is selected. One or more of a plurality of transformation matrices associated with the desired application are applied to the selected image model to produce a manipulated image model representing its associated subject. The transformation matrix can be selected by an operator, predefined as part of a standard series for the training application, or be determined randomly according to a plurality of associated probability density functions representing coefficients with the matrix. A series of vectors, each representing a pixel comprising the image, are multiplied by the one or more transformation matrices to produce a manipulated image model.

At step 312, a training image is created from the manipulated image model. The manipulated image model is first transferred into a desired coordinate domain associated with the run-time operation of the classifier. For example, the coordinate domain can be associated with a camera orientation used for capturing images during the run-time operation of the classifier. This can be accomplished via a pixel-by-pixel mapping process between the two coordinate domains. The mapped data from the transformed image model is then blended with background data and, optionally, data from other image models, to produce a training image comparable to images encountered in the normal operation of the classifier. For example, image data representing an occupant and a vehicle seat can be blended together and then blended with an image of a desired vehicle interior to form a training image. The background data can be adjusted according to the manipulations performed on the image to allow for smooth blending of the image into the background. It will be appreciated that a plurality of different sets of background data can be available to allow for the creation of training images simulating a variety of environments.

At step 314, feature data is extracted from the training image in the form of a feature vector. A feature vector contains a plurality of elements representing selected features of the training image. Each element can assume a value corresponding to its associated image feature. The features extracted from the input image that are selected to be useful in distinguishing among the plurality of input classes. Exemplary features can include disparity features to determine depth and size information, gray scale features including visual appearance and texture, motion features including movement cues, and shape features that include contour and orientation information.

At step 316, the extracted feature vector is provided to a pattern recognition classifier and the associated training image is classified. The classifier processes the feature vector to select a class from its associated output classes and provide a confidence value representing the likelihood that the input image is associated with the selected class. For a vehicle safety system application, the output classes can represent potential occupants of a passenger seat, such as a child class, an adult class, a rearward facing child seat class, an empty seat class, a frontward facing child seat class, object classes, representing briefcases, handbags, shopping bags, etc., and similar useful classes. Similarly, the output classes can represent human heads and other shapes (e.g., headrests) resembling a human head for determining the position of an occupant.

At step 318, the classifier output is compared to the known class of the imaged subject to determine if the classifier has correctly classified the provided training image. If the classification is incorrect, the methodology proceeds to step 320. At step 320, the pattern recognition classifier is trained with the extracted feature vector. The training process of the pattern recognition classifier will vary with the implementation of the classifier, but the training generally involves a statistical aggregation of the feature vectors into one or more parameters associated with the output class.

For example, a pattern recognition classifier implemented as a support vector machine can process the feature vector to refine one or more established functions representing boundaries in a feature space defined by the various attributes of interest. The bounded region for each class defines a range of feature values associated with the class. Similarly, the feature vector and its associated output class information can be processed at a neural network classifier to refine weight values associated with the neural network. Once the classifier has been trained with the extracted feature vector, the method 300 returns to step 310 to create a new training image for analysis.

If the classification is determined to be correct at step 318, the method advances to step 322, where it is determined if a termination event has occurred. For example, the termination event can be one or more of the evaluation of a desired number of training samples, the passage of a certain period of time, the achievement of a desired level of classifier accuracy, or a similar event. A desired level of classifier accuracy can be determined according to a testing parameter selected for a given application. For example, the testing parameter can be a number of consecutive feature vectors that have been classified correctly. Alternatively, the testing parameter can represent an average (e.g., mean or median) of respective confidence values produced with each classification. If no termination event has occurred, the method 300 returns to step 310 to create a new training image for analysis. Each time this process returns to carry out a loop starting at step 310, a different transformation matrix can be selected for manipulation of the image model. Accordingly, a different training image can be produced via the manipulation of the image model. One skilled in the art will appreciate that the illustrated system can create thousands of training images from base image data of each desired output class. If a termination event has occurred, the method 300 proceeds to step 324, where the classifier is accepted.

Figure 5:
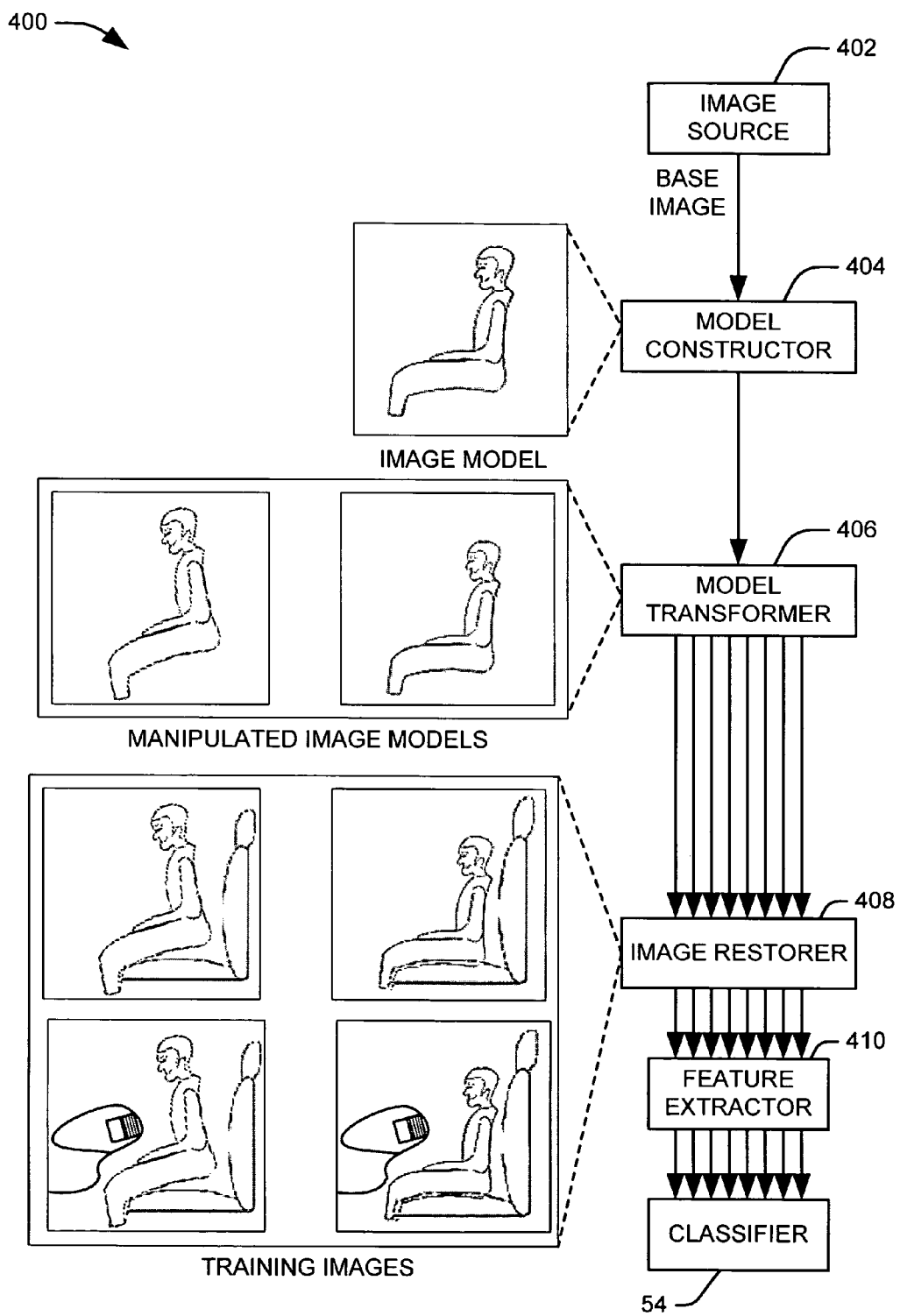
FIG. 5 is a diagram illustrating a classifier training system in accordance with an exemplary embodiment of the present invention.

Referring to FIG. 5, the classifier training process will be better appreciated. A training system 400, in accordance with an exemplary embodiment of the present invention, can be utilized to train a classifier 54 associated with a vehicle safety device control system, such as the actuatable occupant restraint system 20 illustrated in FIG. 1. For example, the classifier 54 can be used to determine an associated class from a plurality of classes for the occupant of a passenger seat of an automobile (e.g., adult, child, rearward facing child seat, etc.) and provide the information to an air bag controller 50 to facilitate control of the deployment of an air bag associated with the seat. Similarly, the classifier 54 can be used to facilitate the identification of an occupant's head by determining if a particular portion of a candidate object resembles a human head. It will be appreciated that the classifier training system 400 and the classifier 54 can be implemented, at least in part, as computer software operating on one or more general purpose microprocessor or microcomputers.

The classifier 54 can be implemented as any of a number of intelligent systems suitable for classifying an input image. In an exemplary embodiment, the classifier 54 can utilize one of a Support Vector Machine ("SVM") algorithm or an artificial neural network ("ANN") learning algorithm to classify the image into one of a plurality of output classes. It will be appreciated that the classifier 54 can comprise a plurality of individual classification systems united by an arbitration system that selects between or combines their outputs.

An image source 402 can be used to acquire base image data for one or more subjects. The image source 402, for example, can comprise a laser holography arrangement that provides data within a desired standard domain or one or more digital stereo cameras that image the one or more subjects of interest within individual coordinate domains to produce base image data. In an exemplary embodiment, the image source can comprise a plurality of stereo cameras, such as that illustrated in FIG. 2, that simultaneously produce a plurality of range images of a subject from different perspectives. For a vehicle safety system application, the subjects can be associated with classes representing potential occupants of a passenger seat, such as a child class, an adult class, a rearward facing child seat class, an empty seat class, and similar useful classes.

For example, the adult class can be represented by images taken of one or more of adult subjects. Multiple adult subjects can be selected to have physical characteristics (e.g., height, weight) that vary across an expected range of characteristics for human adults. A plurality of stereo images can be taken of each subject in a standard position to produce the base image data. This process can be repeated for objects representing the other classes to obtain base image data of one or more subjects for those classes. For example, images can be taken of one or more different models of rearward facing child seats.

A model constructor 404 can process the acquired base image data to produce an image model for each subject. The image data is first processed to improve the resolution and visibility of the image data. Background information can be removed from the image data for each subject to isolate data representing the subject. In an exemplary embodiment, a contrast limited adaptive histogram equalization algorithm can be applied to increase contrast between image features. The preprocessed image data for each subject is then processed to produce an image model within a standard coordinate domain. For example, the image data can be acquired in the standard domain (e.g., by a laser holography arrangement) and fused together to produce a model. Alternatively, the output of multiple stereo cameras can be mapped from a respective original coordinate systems to a standard coordinate system associated with the vehicle interior. The different camera outputs depict a subject from different orientations and can be fused to produce an associated image model for the subject.

A model transformer 406 manipulates a selected image model to produce one or more manipulated image models representing its associated subject. One or more transformation matrices can be applied to the image model via a pixel-by-pixel multiplication to simulate one or more projective, affine, or similitude transformations of the image model. For a classifier associated with a vehicle occupant protection system, the transformations can simulate changes in position by an occupant and an occupant's seat. It will be appreciated that although the occupant determined by the classifier can include both various classes of human beings and non-human objects, the present discussion focuses on human occupants. It will be further appreciated, however, that the described transformation techniques can also be useful in simulating changes in position, size, and other characteristics of other subjects, both within the context of a vehicle occupant protection system and for other classifier systems.

The standard (e.g., vehicle) domain coordinate axes can include an x-axis running from the front of the vehicle to the rear of the vehicle, a y-axis running from the driver's side of the vehicle to the passenger's side of the vehicle, and a vertical z-axis running from the floor to the ceiling. The image model, representing the vehicle occupant, can be translated along any of these axes to represent a movement of the occupant's seat.

For example, the image can be translated in the x-direction to show that the seat has been moved forward or backwards or in the z-direction to simulate the raising or lowering of the seat. A transformation matrix for translation along one or more axes can be represented as follows:

$$\begin{bmatrix} x' \\ y' \\ z' \\ 1 \end{bmatrix} = \begin{bmatrix} 1 & 0 & 0 & t_x \\ 0 & 1 & 0 & t_y \\ 0 & 0 & 1 & t_z \\ 0 & 0 & 0 & 1 \end{bmatrix} \begin{bmatrix} x \\ y \\ z \\ 1 \end{bmatrix} \quad \text{Eq. 3}$$

where $t_x$, $t_y$, and $t_z$ represent a desired amount of translation along the x, y, and z axes respectively.

Similarly, changes in the roll, pitch, and yaw of the image model can represent movements by the occupant within the seat. For example, a change in the roll of the image data can represent the occupant leaning to one side of the seat. A change in pitch can represent a different position of the seat back or the occupant leaning forward from the seat back. A change in yaw can represent the occupant turning from side to side, to look out of one of the side windows, for example. Transformation matrices for rotation of the image data can be represented as follows:

$$\text{Roll:} \begin{bmatrix} x' \\ y' \\ z' \\ 1 \end{bmatrix} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} x \\ y \\ z \\ 1 \end{bmatrix} \quad \text{Eq. 4}$$

where α represents the angle of rotation.

$$\text{Pitch:} \begin{bmatrix} x' \\ y' \\ z' \\ 1 \end{bmatrix} = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} x \\ y \\ z \\ 1 \end{bmatrix} \quad \text{Eq. 5}$$

where β represents the angle of rotation.

$$\text{Yaw:} \begin{bmatrix} x' \\ y' \\ z' \\ 1 \end{bmatrix} = \begin{bmatrix} \cos\gamma & -\sin\gamma & 0 & 0 \\ \sin\gamma & \cos\gamma & 0 & 0 \\ 0 & 0 & 1 & 0 \\ 0 & 0 & 0 & 1 \end{bmatrix} \begin{bmatrix} x \\ y \\ z \\ 1 \end{bmatrix} \quad \text{Eq. 6}$$

where γ represents the angle of rotation.

A transformation can also be performed to change one or more properties of the occupant. For example, the image model can be scaled or sheared to simulate occupants of different sizes and proportions. A transformation matrix for shearing and scaling of an image can be represented as:

$$\begin{bmatrix} x' \\ y' \\ z' \\ 1 \end{bmatrix} = \begin{bmatrix} \delta_x & K_{xy} & K_{xz} & 0 \\ 0 & \delta_y & K_{YZ} & 0 \\ 0 & 0 & \delta_z & 0 \\ 0 & 0 & 0 & 1 \end{bmatrix} \begin{bmatrix} x \\ y \\ z \\ 1 \end{bmatrix} \quad \text{Eq. 7}$$

where $\delta_x$, $\delta_y$, and $\delta_z$ represent desired scaling coefficients and $K_{xy}$, $K_{xz}$, and $K_{yz}$ represent desired shear coefficients.

Each manipulated image model is then provided to an image restorer 408 that produces training images from the models. The image restorer 408 first maps the manipulated image models from the vehicle coordinates to desirable coordinates for the run-time operation of the classifier 54. For example, the coordinates can be associated with a camera arrangement (e.g., the stereo-vision assembly 62) used to capture image data while the classifier 54 is operating. The mapped data from the manipulated image models is then blended with desired background image data to produce training images similar to images that would be acquired by the image source 402 during the operation of the classifier 54.

It will be appreciated that image data can also be blended into the training image from image models representing other subjects. For example, a seat can be included with an occupant, multiple adults can be shown in a single image (e.g., a child and an adult) or multiple objects can be depicted on a seat (e.g., a shopping bag and a briefcase). In an exemplary implementation, the background information utilized at the image restorer 408 can be one of a plurality of background images (e.g., representing different environments) that is altered according to the transformation matrix applied to a given image model. A seat position sensor (not shown) can be connected to the controller 50 to aid in the adjustment of the background image and the image merge.

The training images are provided to a feature extractor 410 that reduces the training images for each class to feature vectors. A feature vector represents an image as a plurality of elements, where each element represents an image feature. Exemplary image features can include disparity features to determine depth and size information, gray scale features including visual appearance and texture, motion features including movement cues, and shape features that include contour and orientation information.

The extracted feature vectors are provided one by one to the classifier 54 as test data. If the classifier correctly classifies the provided feature vector, the feature vector is discarded. If the classification is incorrect, the classifier 54 is provided with the feature vector as a training sample. This continues until a termination event occurs, such as the achievement of a desired level of classifier accuracy or the evaluation of a desired number of training images.

The training process of the classifier 54 will vary with its implementation. For example, an exemplary artificial neural network (ANN) classifier can be provided with each training sample and its associated class as training samples. The ANN calculates weights associated with a plurality of connections (e.g., via back propagation or a similar training technique) within the network based on the provided data. The weights bias the connections within network such that later inputs resembling the training inputs for a given class will produce an output representing the class.

Similarly, a support vector machine (SVM) classifier can analyze the feature vectors with respect to an N-dimensional feature space to determine regions of feature space associated with each class. Each of the N dimensions represents one associated feature of the feature vector. The SVM produces functions, referred to as hyperplanes, representing boundaries in the N-dimensional feature space. The boundaries define a range of feature values associated with each class, and future inputs can be classified according to their position with respect to the boundaries.

From the above description of the invention, those skilled in the art will perceive improvements, changes and modifications. For example, the present invention can be applied to produce training images for any of a variety of classification systems, not just those illustrated herein. Such improvements, changes and modifications within the skill of the art are intended to be covered by the appended claims.

We claim:

1. An occupant classifier training method for use in vehicle restraining systems comprising the steps of:
    at least one processor performing the steps of:
    producing an image model in a vehicle coordinate domain; transforming the image model to simulate at least one desired property associated with a vehicle occupant, wherein transforming the image model comprises applying a transformation matrix, comprising a plurality of randomly selected coefficients, to the image model, the plurality of coefficients being selected according to associated probability density functions; mapping the transformed image model to a camera coordinate domain associated with the run-time operation of the classifier; merging data associated with the transformed image model with a desired background image to create a training image; and training a pattern recognition classifier using the training image.

2. The method of claim 1 wherein the step of producing the image model includes:
    imaging a subject with a plurality of stereo camera assembles, each comprising at least two cameras, arranged at a plurality of different orientations to acquire base image data from each camera;
    mapping at least a portion of the acquired base image data at each stereo camera assembly from a coordinate domain associated with the stereo camera assembly to a vehicle coordinate domain; and
    fusing the mapped image data from the plurality of stereo camera assemblies to produce an image model representing the subject.

3. The method of claim 1 wherein the step of training the classifier includes classifying the training image and providing training data associated with the training image to the classifier if the classifier produces an incorrect classification.

4. The method of claim 1 wherein the steps of transforming the image model, mapping the transformed image model to the camera coordinate domain, and training the classifier are repeated iteratively until a termination event occurs.

5. The method of claim 4, wherein the termination event is the achievement of a desired level of classifier accuracy.

6. The method of claim 1 further comprising extracting feature data from the training image.

* * * * *

UNITED STATES PATENT AND TRADEMARK OFFICE
CERTIFICATE OF CORRECTION

PATENT NO. : 7,609,893 B2
APPLICATION NO. : 10/792445
DATED : October 27, 2009
INVENTOR(S) : Luo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this

Twelfth Day of October, 2010

David J. Kappos
*Director of the United States Patent and Trademark Office*